United States Patent
Kim et al.

(10) Patent No.: US 7,746,950 B2
(45) Date of Patent: Jun. 29, 2010

(54) SIGNAL DETECTION METHOD FOR MIMO COMMUNICATION SYSTEM EMPLOYING SPATIAL MULTIPLEXING

(75) Inventors: Jae-Kwon Kim, Suwon-si (KR); Seung-Hoon Nam, Seoul (KR)

(73) Assignee: Samsung Electronics Co., Ltd (KR)

( * ) Notice: Subject to any disclaimer, the term of this patent is extended or adjusted under 35 U.S.C. 154(b) by 903 days.

(21) Appl. No.: 11/507,285

(22) Filed: Aug. 21, 2006

(65) Prior Publication Data

US 2007/0041467 A1    Feb. 22, 2007

(30) Foreign Application Priority Data

Aug. 19, 2005    (KR) .................... 10-2005-0076506

(51) Int. Cl.
*H04B 7/02* (2006.01)
*H04L 1/02* (2006.01)
(52) U.S. Cl. ........................ 375/267; 375/341
(58) Field of Classification Search ............ 375/262, 375/267, 341, 347; 455/272
See application file for complete search history.

(56) References Cited

U.S. PATENT DOCUMENTS 7,489,746 B1 * 2/2009 Awater et al. .............. 375/347
2005/0249302 A1 * 11/2005 Leshem et al. ............. 375/267

FOREIGN PATENT DOCUMENTS

EP          1 460 813 A1    9/2004
KR          1020050046306    5/2005

OTHER PUBLICATIONS

Takayuki Fukatani et al, Two Methods for Decreasing the Computational Complexity of the MIMO ML Decoder, Oct. 2004.
Lei He et al, Reduced Complexity Maximum Likelihood Detection for V-Blast Systems, 2003.

* cited by examiner

*Primary Examiner*—Betsy L Deppe
(74) *Attorney, Agent, or Firm*—The Farrell Law Firm, LLP

(57) ABSTRACT

Disclosed is a signal detection method for a receiver of a Multiple-Input Multiple-Output (MIMO) communication system having $n_T$ and $n_R$ (where $n_R$ is greater than or equal to $n_T$) transmission and reception antennas, respectively, and an $n_T \times n_R$ channel matrix. The signal detection method includes selecting a plurality of sub-channel matrices having smaller dimensions than the $n_T \times n_R$ channel matrix, estimating transmission symbols received from corresponding transmission antennas using a maximum likelihood decoding method with respect to a received signal corresponding to each of the sub-channel matrices, estimating transmission symbols received from the remaining transmission antenna(s) using the estimated transmission symbols, temporarily storing a candidate symbol set composed of the estimated transmission symbols, and comparing candidate symbol sets corresponding to all the sub-channel matrices and determining the smallest candidate symbol set as a transmission symbol set.

6 Claims, 2 Drawing Sheets

$$\begin{bmatrix} y_1 \\ y_2 \\ y_3 \end{bmatrix} = \begin{bmatrix} \bigcirc & \bigcirc & \bigcirc \\ \bigotimes & \bigcirc & \bigcirc \\ \bigotimes & \bigcirc & \bigcirc \end{bmatrix} \begin{bmatrix} x_1 \\ x_2 \\ x_3 \end{bmatrix} + \begin{bmatrix} z_1 \\ z_2 \\ z_3 \end{bmatrix}$$

11

$$\begin{bmatrix} y_1 \\ y_2 \\ y_3 \end{bmatrix} = \begin{bmatrix} \bigcirc & \bigcirc & \bigcirc \\ \otimes & \bigcirc & \bigcirc \\ \otimes & \bigcirc & \bigcirc \end{bmatrix} \begin{bmatrix} x_1 \\ x_2 \\ x_3 \end{bmatrix} + \begin{bmatrix} z_1 \\ z_2 \\ z_3 \end{bmatrix}$$

11

FIG.1A $$\{x_2, \text{opt } x_3, \text{opt}\} = \arg\min_{x_2, x_3} \left\| \begin{bmatrix} y_2 \\ y_3 \end{bmatrix} - \begin{bmatrix} \bigcirc & \bigcirc \\ \bigcirc & \bigcirc \end{bmatrix} \begin{bmatrix} x_2 \\ x_3 \end{bmatrix} \right\|$$

SIGNAL DETECTION METHOD FOR MIMO COMMUNICATION SYSTEM EMPLOYING SPATIAL MULTIPLEXING

PRIORITY

This application claims priority under 35 U.S.C. §119 to an application filed in the Korean Intellectual Property Office on Aug. 19, 2005 and assigned Serial No. 2005-76506, the contents of which are incorporated herein by reference.

BACKGROUND OF THE INVENTION

1. Field of the Invention

The present invention generally relates to a wireless communication system, and in particular, to a signal detection method for a Multiple-Input Multiple-Output (MIMO) communication system employing spatial multiplexing.

2. Description of the Related Art

Generally, a signal transmitted in a wireless environment experiences more distortion than it would if it were transmitted in a wired environment due to various factors such as a multi-path phenomenon, attenuation, time-varying noise, and/or interruption. A fading phenomenon due to the multi-path phenomenon is closely related to reflection caused by a geographical structure and/or movement of a receiver. Accordingly, a transmission signal passing through a fading channel is typically is distorted when it is received which results in a degradation of system performance. As such, the fading phenomenon is a key factor that obstructs high-speed data communication in the wireless environment. Therefore, minimizing a loss in a wireless channel due to factors such as fading and/or user interference is necessary for high-speed data communication in the wireless environment.

To overcome the fading phenomenon, a transmission method using a space diversity scheme can be used. The space diversity scheme includes a transmission antenna diversity scheme using multiple transmission antennas and a reception antenna diversity scheme using multiple reception antennas. A system achieving space diversity using multiple reception antennas and multiple transmission antennas is referred to as a Multiple-Input Multiple-Output (MIMO) system.

In the MIMO system, data that is to be transmitted through a corresponding antenna of multiple transmission antennas is determined by Space-Time Coding (STC). Likewise, when receiving, each of the multiple reception antennas receives a signal transmitted from each of corresponding multiple transmission antennas and performs Space-Time Decoding (STD).

Space-Time Coding (STC) is implemented by a space-time transmission diversity scheme in which the same data is coded into different formats to be transmitted through different transmission antennas or a spatial multiplexing scheme in which different data is transmitted through different transmission antennas.

An STC signal in the spatial multiplexing scheme is generally decoded by a joint or separate detection method at a receiver. The joint detection method should consider not only a signal transmitted from a single transmission antenna but also signals transmitted from other transmission antennas.

For this reason, a maximum likelihood decoding scheme is widely used as the optimal decoding algorithm for an MIMO system employing spatial multiplexing. By using the maximum likelihood decoding scheme, it is possible to acquire a diversity degree that is the same as the number of reception antennas regardless of the number of transmission antennas. Thus, the maximum likelihood decoding scheme exhibits superior performance over other decoding schemes such as a Minimum Mean Square Error (MMSE) scheme and a zero-forcing scheme in terms of a Signal-to-Noise Ratio (SNR) and SNR gain (which increases proportionally to the number of transmission antennas).

However, the complexity of the maximum likelihood decoding scheme increases exponentially as the number of transmission antennas increases, thus, requiring greater computational ability and increasing power usage, cost, and computational time. Accordingly, there is a need for a system and method to reduce computational complexity in a MIMO communication system.

SUMMARY OF THE INVENTION

It is, therefore, an object of the present invention to provide a signal detection method for a MIMO system employing spatial multiplexing, in which decoding complexity can be minimized without compromising decoding performance.

According to one aspect of the present invention, there is provided a signal detection method for a receiver of a Multiple-Input Multiple-Output (MIMO) communication system having an $n_T \times n_R$ channel matrix, in which the MIMO communication system includes a transmitter for transmitting a signal through $n_T$ transmission antennas and the receiver for receiving the signal through $n_R$ reception antennas (where $n_R$ is greater than or equal to $n_T$). The signal detection method includes the steps of selecting at least one sub-channel matrix having a smaller dimension than the channel matrix, detecting transmission symbols received from corresponding transmission antennas through maximum likelihood decoding with respect to a received signal corresponding to the selected sub-channel matrix, and detecting transmission symbols received from the remaining transmission antenna(s) using the detected transmission symbols.

According to another aspect of the present invention, there is provided a signal detection method for a receiver of a Multiple-Input Multiple-Output (MIMO) communication system having a $n_T \times n_R$ channel matrix, in which the MIMO communication system includes a transmitter for transmitting a signal through $n_T$ transmission antennas and the receiver for receiving the signal through $n_R$ reception antennas (where $n_R$ is greater than or equal to $n_T$). The signal detection method includes the steps of selecting two transmission antennas and two reception antennas from among the $n_T$ transmission antennas and the $n_R$ reception antennas, detecting transmission symbols received from corresponding transmission antennas through maximum likelihood decoding with respect to received signals corresponding to a 2×2 sub-channel matrix formed by the selected two transmission antennas and the selected two reception antennas, and detecting transmission symbols received from a transmission antenna corresponding to a channel matrix whose dimension increases up to $n_T \times n_R$, by one dimension, using the detected transmission symbols.

According to a further aspect of the present invention, there is provided a signal detection method for a receiver of a Multiple-Input Multiple-Output (MIMO) communication system having a $n_T \times n_R$ channel matrix, in which the MIMO communication system includes a transmitter for transmitting a signal through $n_T$ transmission antennas and the receiver for receiving the signal through $n_R$ reception antennas (where $n_R$ is greater than or equal to $n_T$). The signal detection method includes the steps of selecting a plurality of sub-channel matrices having smaller dimensions than the channel matrix, estimating transmission symbols received from corresponding transmission antennas through maximum likelihood decoding with respect to a received signal corresponding to each of the sub-channel matrices, estimating transmission symbols received from the remaining transmission antenna(s) using the estimated transmission symbols, temporarily storing a candidate symbol set composed of the estimated transmission symbols, and comparing candidate symbol sets corresponding to all the selected sub-channel matrices and determining the minimum candidate symbol set as a transmission symbol set.

BRIEF DESCRIPTION OF THE DRAWINGS

The above and other objects, features and advantages of the present invention will become more apparent from the following detailed description when taken in conjunction with the accompanying drawings in which:

FIG. 1A is a diagram illustrating matrixes for explaining a sub-system selecting process in a signal detection method for an MIMO system employing spatial multiplexing according to the present invention;

FIG. 1B is a diagram for explaining an ML decoding process in a sub-system selected in FIG. 2.

DETAILED DESCRIPTION OF THE PREFERRED EMBODIMENT

Figure 2:
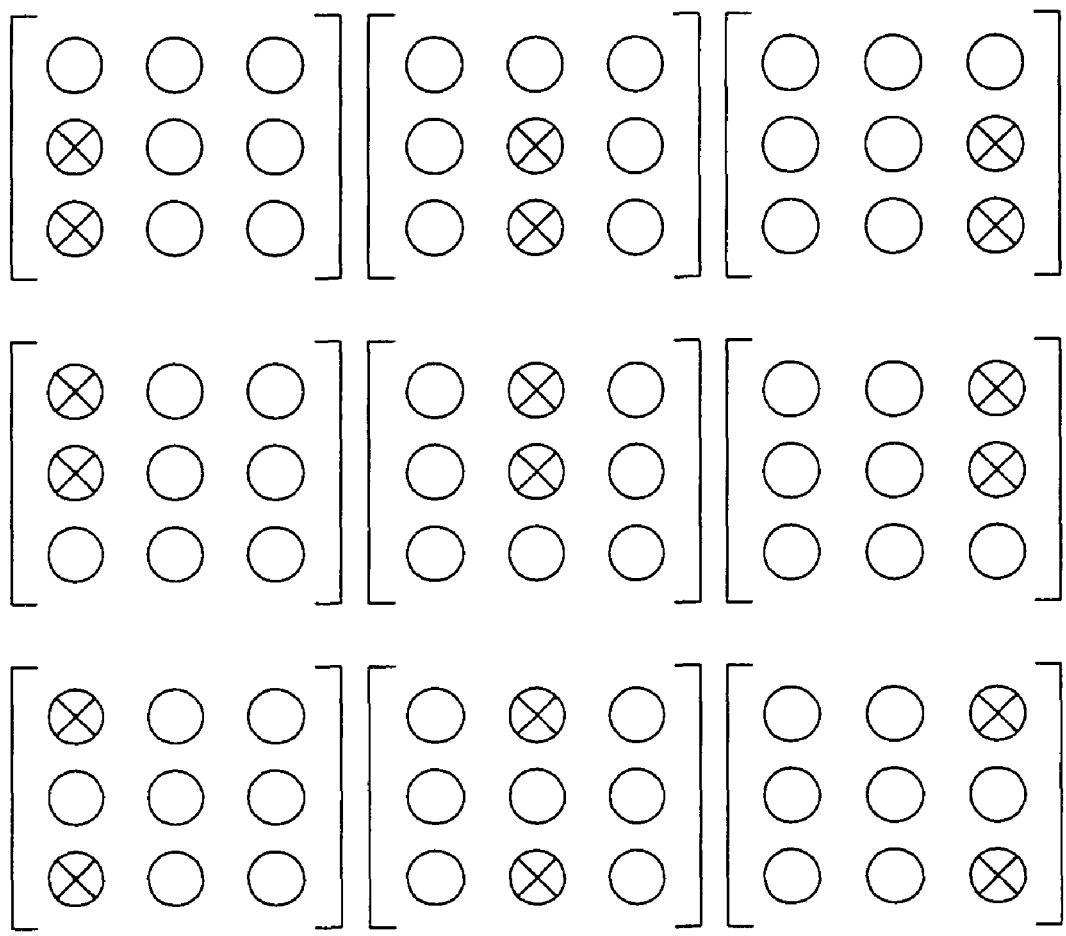
FIG. 2 is a diagram illustrating sub-systems that can be configured from a 3×3 system in a signal detection method for an MIMO system employing spatial multiplexing according to the present invention.

Preferred embodiments of the present invention will now be described in detail with reference to the annexed drawings. In the following description, a detailed description of known functions and configurations incorporated herein has been omitted for conciseness.

An MIMO system including $n_T$ transmission antennas and $n_R$ reception antennas, to which a signal detection method according to the present invention is applied, is expressed as Equation (1):

$$\underbrace{\begin{pmatrix} y_1 \\ y_2 \\ \vdots \\ y_{n_R} \end{pmatrix}}_{y} = \underbrace{\begin{pmatrix} h_{11} & h_{12} & \cdots & h_{1n_T} \\ h_{21} & h_{22} & \cdots & h_{2n_T} \\ \vdots & \vdots & \ddots & \vdots \\ h_{n_R 1} & h_{n_R 2} & \cdots & h_{n_R n_T} \end{pmatrix}}_{H} \underbrace{\begin{pmatrix} x_1 \\ x_2 \\ \vdots \\ x_{n_T} \end{pmatrix}}_{x} + \underbrace{\begin{pmatrix} z_1 \\ z_2 \\ \vdots \\ z_{n_R} \end{pmatrix}}_{z} \quad \text{Equation (1)}$$

where $x_i$ indicates a transmission signal transmitted from an $i^{th}$ transmission antenna (where i=1, 2, ..., $n_T$), $y_i$ indicates a reception signal received from an $i^{th}$ reception antenna (where i=1, 2, ..., $n_R$), and $z_i \sim N(0,\sigma_z^2)$ indicates a Gaussian noise (i=1, 2, ..., $n_R$). Herein, $N(0,\sigma_z^2)$ is a Normal distribution of which the average is "0" and the standard deviation is $\sigma^2$.

On the assumption that $x_i$ is an M-QAM (M-Order Quadrature Amplitude Modulation) signal, a Maximum Likelihood (ML) can be expressed as follows using Equation (2).

$$x_{ML} = \arg\min_x \|y - Hx\| \quad \text{Equation (2)}$$

For an exhaustive search, $M^{n_T}$ combinations for a transmission symbol should be considered.

Theorem 1. Necessary and Sufficient Condition to Calculate an ML (Maximum Likelihood) Solution In a linear system of Equation (1), when $I=\{1, 2, \ldots, n_T\}$ is defined and ML solutions for $j \in I$ are assumed to be $x_i$,ML ($i \in I \setminus \{j\}$), an ML solution is $x_j$,ML if $x_j$ satisfies the Equation (3):

$$x_j = Q\left(\frac{h_j^H}{\|h_j\|^2}\left(y - \sum_{i \in I \setminus \{j\}} h_i x_{i,ML}\right)\right) \quad \text{Equation (3)}$$

where $Q(\bullet)$ indicates a slicing function and $h_i$ indicates an $i^{th}$ column of a system matrix H ($i \in I$).

Equation (4) can be induced from the definition of the ML solution.

$$\min_{\{x_i | i \in I\} \in c^{n_T}} \|y - Hx\| = \min_{x_j \in c} \left\| y - \sum_{i \in I \setminus \{j\}} h_i x_{i,ML} - h_j x_j \right\| \quad \text{Equation (4)}$$

Herein, C represents Constellation. Therefore, if Equation (5) is satisfied, $x_j$ is also the ML solution.

$$\begin{aligned} x_j &= \arg\min_{x_j} \left\| y - \sum_{i \in I \setminus \{j\}} h_i x_{i,ML} - h_j x_j \right\| \quad \text{Equation (5)} \\ &\stackrel{a}{=} \arg\min_{x_j} \left\| \frac{h_j^H}{\|h_j\|^2}\left(y - \sum_{i \in I \setminus \{j\}} h_i x_{i,ML}\right) - x_j \right\| \\ &\stackrel{b}{=} Q\left(\frac{h_j^H}{\|h_j\|^2}\left(y - \sum_{i \in I \setminus \{j\}} h_i x_{i,ML}\right)\right) \end{aligned}$$

The relationship a is proved using Equations 6-9 below, and the relationship b is true based on the definition of the slicing function.

The proof of the relationship a:

If $$\xi_j \triangleq \frac{h_j}{\|h_j\|}$$

is defined, Equation (6) can be induced from Equation (5).

$$y - \sum_{i \in I \setminus \{j\}} h_i x_{i,ML} = \alpha \xi_j + \beta \xi_j \frac{1}{j} \quad \text{Equation (6)}$$

where $\alpha$, $\beta$, and $\xi_j$ are defined as follows.

$$\alpha = \xi_j^H \left(y - \sum_{i \in I \setminus \{j\}} h_i x_{i,ML}\right) \quad \text{Equation (7)}$$

$$\beta = \left\| y - \sum_{i \in I \setminus \{j\}} h_i x_{i,ML} - \alpha \xi_j \right\| \quad \text{Equation (8)}$$

-continued $$\xi \frac{1}{j} = \frac{y - \sum_{i \in N\{j\}} h_i x_{i,ML} - \alpha \xi_j}{\beta} \quad \text{Equation (9)}$$

Thus, the objective function of Equation (6) can be expressed as Equation (10).

$$\left\| y - \sum_{i \in N\{j\}} h_i x_{i,ML} - h_j x_j \right\| = \left\| \alpha \xi_j + \beta \xi \frac{1}{j} - \|h_j\| x_j \xi_j \right\| \quad \text{Equation (10)}$$

$$= \left\| (\alpha - x_j \|h_j\|) \xi_j + \beta \xi \frac{1}{j} \right\|$$

$$= \sqrt{\|\alpha - \|h_j\| x_j\|^2 + \|\beta\|^2}$$

where the square root function is a cumulative function and the $\|\beta\|$ term is a constant for the given $x_i, \text{ML}(i \in I\setminus\{j\})$. Thus, by minimizing $\|\alpha - \|hj\| \|xj\|\|$, the same effect as when minimizing the objective function of Equation (11) can be achieved.

$$\left\| \frac{\alpha}{\|h_j\|} - x_j \right\| = \left\| \frac{h_j^H}{\|h_j\|^2} \left( y - \sum_{i \in N\{j\}} h_i x_i, ML \right) - x_j \right\| \quad \text{Equation (11)}$$

It can be seen from Equation (6) that the last element is acquired from Maximal Ratio Combining (MRC) and slicing when ML solutions $x_i, \text{ML}(i \in I\setminus\{j\})$ are the same as transmission signals.

In a signal detection method according to a first embodiment of the present invention, an improved ML decoding method is suggested.

Theorem 2. Modified ML (MML) Algorithm

Thus, according to the present invention, the ML problem for $j \in I$ in the linear system expressed as Equation (1) can be re-arranged as Equation (3).

$$\{x_{i,ML} | i \in I \setminus \{j\}\} = \quad \text{Equation (12)}$$

$$\arg \min_{\{x_i | i \in N\{j\}\}} \left\| y - \sum_{i \in N\{j\}} h_i x_i - h_j Q \left( \frac{h_j^H}{\|h_j\|^2} \left( y - \sum_{i \in N\{j\}} h_i x_i \right) \right) \right\|$$

The ML solution $x_j$,ML is calculated by Theorem 1.

More specifically, Equation (13) can be induced from Theorem 1.

$$\min_{\{x_i | i \in I\}} \|y - Hx\| = \quad \text{Equation (13)}$$

$$\left\| y - \sum_{i \in N\{j\}} h_i x_{i,ML} - h_j Q \left( \frac{h_j^H}{\|h_j\|^2} \left( y - \sum_{i \in N\{j\}} h_i x_{i,ML} \right) \right) \right\|$$

Thus, Equation (14) can be acquired for $j \in I$ and $x_t \in C$ ($i \in I \setminus \{j\}$).

$$\left\| y - \sum_{i \in N\{j\}} h_i x_{i,ML} - h_j Q \left( \frac{h_j^H}{\|h_j\|^2} \left( y - \sum_{i \in N\{j\}} h_i x_{i,ML} \right) \right) \right\| \leq \quad \text{Equation (14)}$$

$$\left\| y - \sum_{i \in N\{j\}} h_i x_i - h_j Q \left( \frac{h_j^H}{\|h_j\|^2} \left( y - \sum_{i \in N\{j\}} h_i x_i \right) \right) \right\|$$

Through the foregoing process, Equation (15) is proved.

$$\{x_{i,ML} | i \in I\setminus\{j\}\} \in \{\{x_i | i \in I\setminus\{j\}\} | x_t \in C, i \in I\setminus\{j\}\} \quad \text{Equation (15)}$$

From Equations (14) and (15), Equation (16) can be acquired.

$$\left\| y - \sum_{i \in N\{j\}} h_i x_{i,ML} - h_j Q \left( \frac{h_j^H}{\|h_j\|^2} \left( y - \sum_{i \in N\{j\}} h_i x_{i,ML} \right) \right) \right\| = \quad \text{Equation (16)}$$

$$\min_{\{x_i | i \in N\{j\}\}} \left\| y - \sum_{i \in N\{j\}} h_i x_i - h_j Q \left( \frac{h_j^H}{\|h_j\|^2} \left( y - \sum_{i \in N\{j\}} h_i x_i \right) \right) \right\|$$

Thus, by Theorem 1, Equation (17) and the ML solution for $x_j$ can be acquired.

$$\{x_{i,ML} | i \in I\setminus\{j\}\} = \arg\{x_i | i \overset{min}{\in} I\setminus\{j\}\} \quad \text{Equation (17)}$$

$$\left\| y - \sum_{i \in N\{j\}} h_i x_i - h_j Q \left( \frac{h_j^H}{\|h_j\|^2} \left( y - \sum_{i \in N\{j\}} h_i x_i \right) \right) \right\|$$

By using the MML theorems according to the present invention, it is necessary to calculate only $M^{n_T-1}$ matrices for the exhaustive search, thereby reducing the number of matrix calculations by the coefficient of a constellation size M. For example, in the case of a $2 \times n_R$ MIMO system, M matrix calculations are required for an ML search.

Hereinafter, a signal detection method for an MIMO system employing spatial multiplexing according to a second embodiment of the present invention will be described.

Even if the number of matrix calculations according to the MML algorithm is reduced by the coefficient of a constellation size, the complexity of matrix calculation increases with an increase in $n_T$. When $n_T$ is large, recursive spatial demultiplexing can be used in the second embodiment of the present invention to further reduce the complexity of the MML algorithm.

To formulate the recursive MML problem for $n_T \geq 3$, a system in which $n_T = n_R = 3$ will be used for the sake of clarity. To calculate the sub-optimal solution of the 3×3 ML problem, the 3×3 ML problem is not directly solved. Instead, the solution of the ML problem of a 2×2 sub-system of a 3×3 system is calculated. When the signal detection method according to the first embodiment of the present invention is used, matrix calculation amounting to $|C|^2$ is required to calculate the solution of the 3×3 ML problem. If the ML problem is solved using six 2×2 sub-systems, matrix calculation amounts to $6 \times |C|$. Thus, computational complexity in a system using large constellation sizes such as 16-QAM or 64-QAM can be reduced about to $\frac{6}{|C|}$ (i.e., respectively) $\frac{3}{8}$ and $\frac{3}{32}$, respectively).

FIGS. 1A and 1B are diagrams illustrating matrixes for explaining the signal detection method for an MIMO system employing spatial multiplexing according to the first embodiment of the present invention. In the signal detection method according to the second embodiment of the present invention, some of elements of the original channel matrix are forcedly set to 0 to select a 2×2 sub-system. To this end, a Givens rotation is used. Through two Givens rotations, both a reception signal and a noise component are transformed. However, since a Givens rotation matrix is an identity matrix, noise remains unchanged.

In FIG. 1A, $h_{21}$ and $h_{31}$ among elements of a 3×3 channel matrix are set to 0 and a 2×2 sub-system 11 composed of $h_{22}$, $h_{23}$, $h_{32}$, and $h_{33}$ is selected. In FIG. 1A, ⓧ represents to be set as '0'.

Once the 2×2 sub-system 11 is configured, it is solved using the MML algorithm according to the first embodiment of the present invention in order to determine two transmission symbols as shown in FIG. 1B.

If solutions in transmission symbol determination are assumed to be the ML solutions of the original system, the solution for the last symbol can be calculated by Theorem 1 as Equation (13):

$$x_{1,opt} = Q\left(\frac{h_1^H}{\|h_1\|^2}\left(y - \sum_{i=2,3} h_i x_{i,opt}\right)\right) \quad \text{Equation (18)}$$

If solutions in symbol determination are assumed to be the ML solutions of the 3×3 system, the last estimated component is also the ML solution of the 3×3 system. However, it may be difficult to ascertain whether solutions in symbol determination are the same as the ML solutions of the original large system. Thus, the ML solution of the 3×3 system can provide a diversity degree of 3, whereas the ML solution of the 2×2 sub-system can only provide a diversity degree of 2. When solutions in transmission symbol determination are not the ML solutions of the original 3×3 system, a solution in the last step, (i.e., Equation 18), is not the ML solution, either.

To compensate for a diversity loss in transmission symbol determination, several 2×2 sub-systems may be configured from the original 3×3 system.

FIG. 2 illustrates 2×2 sub-systems that can be configured from a 3×3 system in the signal detection method according to the second embodiment of the present invention, in which nine 2×2 sub-systems are configured from the 3×3 system. A single candidate set is calculated for each of the sub-systems and a calculation result is stored for subsequent matrix comparison. A set having the minimum matrix is selected from among the candidate sets.

Hereinafter, a process of forming sub-systems and solving each of the sub-systems to calculate the solution of the entire system in the signal detection method according to the second embodiment of the present invention will be generalized.

If a channel matrix is $H \in \mathbb{C}^{n_R \times n_T}|$ in a system in which $n_R \geq n_T > 3$, several sub-systems in a $H \in \mathbb{C}^{n_R \times n_T}|$ dimension can be configured.

$(n_R-2) \times (n_T-2)$ sub-systems may be configured to solve a $(n_R-1) \times (n_T-1)$ system, and a sub-system of a smaller size may be configured until a $(n_R-n_T+2) \times 2$ sub-system that can be solved using the MML theorems is acquired.

Considering a Givens rotation required to configure the $(n_R-1) \times (n_T-1)$ system from the $(n_R-2) \times (n_T-2)$ sub-systems, the original system matrix $H \in \mathbb{C}^{n_R \times n_T}$ is multiplied by the following matrix of Equation (19):

$$\prod_{\{p,q\}}^{n_R-1} G(p,q,k) \quad \text{Equation (19)}$$

In the matrix of Equation 19, p and q are the rows and columns, and k is the element. If p<q in G(p,q,k) of Equation (19), a Givens rotation matrix is expressed as Equation (20). If q<p in G(p,q,k) of Equation (19), the Givens rotation matrix is expressed as Equation (21).

$$G(p,q,k) = \begin{bmatrix} 1 & 0 & \cdots & & & 0 \\ & \ddots & & & & \\ & & c & & s & \\ & & & \ddots & & \\ & & -s & & c & \\ & & & & \ddots & \\ 0 & \cdots & & & 0 & 1 \end{bmatrix} \begin{matrix} \\ \\ \leftarrow p \\ \\ \leftarrow q \\ \\ \end{matrix} \quad \text{Equation (20)}$$

$$\begin{matrix} \uparrow & \uparrow \\ p & q \end{matrix}$$

$$G(p,q,k) = \begin{bmatrix} 1 & 0 & \cdots & & & 0 \\ & \ddots & & & & \\ & & c & & -s & \\ & & & \ddots & & \\ & & s & & c & \\ & & & & \ddots & \\ 0 & \cdots & & & 0 & 1 \end{bmatrix} \begin{matrix} \\ \\ \leftarrow q \\ \\ \leftarrow p \\ \\ \end{matrix} \quad \text{Equation (21)}$$

$$\begin{matrix} \uparrow & \uparrow \\ q & p \end{matrix}$$

In Equations (20) and (21), $$c = \frac{H(p,k)}{\sqrt{|H(p,k)|^2 + |H(q,k)|^2}} \quad \text{and} \quad s = \frac{H(q,k)}{\sqrt{|H(p,k)|^2 + |H(q,k)|^2}}.$$

$G(p,q,k)$ causes an $(q,k)^{th}$ element of a subject matrix to be 0 if p<q and an $(p,k)^{th}$ element of the subject matrix to be 0 if p>q.

Table 1 shows a Recursive MML (RMML) in the signal detection method according to the second embodiment of the present invention.

TABLE 1

| | |
|---|---|
| 1 | function $[\hat{x}] = \text{RMML}(y \in C^{n_R}, H \in C^{n_R \times n_T})$ |
| 2 | cost=initial big number |
| 3 | if $n_T = 2$ |
| 4 |   for $i = 1 : |C|^\dagger$ |
| 5 |     $x_1 = C(i)$ |
| 6 |     $r_2 = Q\left(\frac{h_2^H}{\|h_2\|^2}(y - h_1 x_1)\right)$ |

TABLE 1-continued

```
7      if cost > ||y − Hx||
8         cost=||y = Hx||
9         x̂ = x
10     end
11   end
12 end
13 return x̂
14 for for i = 1 : candidate-size(η_T)
15    subsystem construction; ȳ ∈ C^(nR−1) and H̄ ∈ C^((nR−1)×(nT−1))
16    solve the subsystem: x̄ ∈ C^(nT−1) = RMML(ȳ, H̄)
17
```

$$\text{obtain the last element, } x_j = Q\left(\frac{h_2^H}{\|h_i\|^2}\left(y - \sum_{i \in N\{j\}} h_i \bar{x}_i\right)\right)$$

```
18   construct a candidate set x ∈ C^nT from x̄ ∈ C^(nT−1) and x_j
19   if cost > ||y − Hx||
20      cost=||y − Hx||
21      x̂ = x
22   end
22 end
24 return x̂
```

In Table 1, †C indicates a constellation for symbol mapping and |C|| indicates the number of elements of a set c.

Table 2 shows a comparison between computational complexities when signal detection methods according to the present invention and a conventional signal detection method are applied to a 4×4 spatial multiplexing MIMO system.

TABLE 2

|  | 16-QAM | 64-QAM |
|---|---|---|
| RMML | Division: 176<br>Multiplication: 7,186 | Division: 176<br>Multiplication: 21,008 |
| MML | Division: 0<br>Multiplication: 81,920 | Division: 0<br>Multiplication: 5,242,880 |
| ML | Division: 0<br>Multiplication: 1,310,720 | Division: 0<br>Multiplication: 335,544,320 |

As can be seen from Table 2, the signal detection methods using the MML algorithm and the RMML algorithm according to the present invention require fewer calculations than the conventional signal detection method using the ML algorithm. The signal detection method using the RMML algorithm according to the second embodiment of the present invention requires fewer calculations than the conventional signal detection method when constellation size is small.

As described above, according to the present invention, by minimizing decoding complexity while maintaining the optimal decoding performance of ML decoding, system performance can be improved.

Moreover, according to the present invention, a sub-system composed of some of elements of a channel matrix is selected in a system having a large number of transmission/reception antennas and a decoding operation is performed. The entire signal is then detected using a signal acquired from the sub-system, thereby further reducing decoding complexity.

Furthermore, according to the present invention, the entire signal is detected using a plurality of sub-system channel matrices selected from a channel matrix of the entire system, thereby minimizing both a diversity loss, caused by sub-system selection, and decoding complexity.

While the present invention has been shown and described with reference to preferred embodiments thereof, it will be understood by those skilled in the art that various changes in form and detail may be made therein without departing from the spirit and scope of the invention.

What is claimed is:

1. A signal detection method for a receiver of a Multiple-Input Multiple-Output (MIMO) communication system having a $n_T \times n_R$ channel matrix, in which the MIMO communication system includes a transmitter for transmitting a signal trough $n_T$ transmission antennas and the receiver for receiving the signal through $n_R$ reception antennas (where $n_R$ is greater than or equal to $n_T$), the signal detection method comprising:

selecting at least one sub-channel matrix having a lower dimension than the channel matrix;

detecting transmission symbols received from corresponding transmission antennas through maximum likelihood decoding with respect to a received signal corresponding to the selected sub-channel matrix; and detecting transmission symbols received from the remaining transmission antenna(s) using the previously detected transmission symbols.

2. The signal detection method of claim 1, wherein the step of selecting the at least one sub-channel matrix comprises:

selecting a predetermined number of reception antennas from among the $n_R$ reception antennas forming the channel matrix; and determining a channel matrix formed by the selected reception antennas and their corresponding transmission antennas as the sub-channel matrix.

3. The signal detection method of claim 1, wherein the step of selecting the at least one sub-channel matrix having a lower dimension than the channel matrix comprises:

selecting a predetermined number of reception antennas from among the $n_R$ reception antennas forming the channel matrix;

selecting a number transmission antennas which corresponds to the number of selected reception antennas; and determining a channel matrix formed by the selected reception antennas and the selected transmission antennas as the sub-channel matrix.

4. A Multiple-Input Multiple-Output (MIMO) communication system having a $n_T \times n_R$ channel matrix, in which the MIMO communication system includes a transmitter for transmitting a signal through $n_T$ transmission antennas and a receiver for receiving the signal through $n_R$ reception antennas (where $n_R$ is greater than or equal to $N_T$), comprising:

the receiver for selecting at least one sub-channel matrix having a lower dimension than the channel matrix, detecting transmission symbols received from corresponding transmission antennas through maximum likelihood decoding with respect to a received signal corresponding to the selected sub-channel matrix, and detecting transmission symbols received from remaining transmission antenna(s) using the detected transmission symbols received from the corresponding transmission antennas.

5. The MIMO communication system of claim 4, wherein the receiver selects a predetermined number of reception antennas from among the $n_R$ reception antennas forming the channel matrix, and determines a channel matrix formed by the selected reception antennas and transmission antennas corresponding to the selected reception antennas as the sub-channel matrix.

6. The MIMO communication system of claim 4, wherein the receiver selects a predetermined number of reception antennas from among the $n_R$ reception antennas forming the channel matrix, selects a number of transmission antennas which corresponds to the number of selected reception antennas, and determines a channel matrix formed by the selected reception antennas and the selected transmission antennas as the sub-channel matrix.

* * * * *